3,767,717
PROCESS FOR PREPARING ALKENYL NORBORNENES
Henricus M. J. C. Creemers, Geleen, Netherlands, assignor to Stamicarbon N.V., Heerlen, Netherlands
No Drawing. Filed Oct. 18, 1971, Ser. No. 189,830
Claims priority, application Netherlands, Oct. 24, 1970, 7015609
Int. Cl. C07c 5/24
U.S. Cl. 260—666 PY          15 Claims

ABSTRACT OF THE DISCLOSURE

A process for the preparation of alkenyl norbornenes is disclosed. Alkenyl norbornenes are prepared by reaction of a norbornadiene-2,5 with an open chain alkene having from 2 to 10 carbon atoms and a terminal double bond, the process being carried out with a catalyst system essentially comprising (1) an alkyl compound of a metal of one of the Groups I, II and III of the Periodic Table, preferably aluminium or magnesium, and wherein the alkyl groups have from 1 to 10 carbon atoms; and (2) the inorganic or organic acid salt of a metal of Group VIII of the Periodic Table; as well as, optionally, (3) an aliphatically-saturated phosphine, carrying either alkyl or aryl substituents of up to 10 carbon atoms each; and (4) a second, fully alkylated, compound of a metal of one of the Groups I, II and III of the Periodic Table, the alkyl groups of which compound can have up to about 10 carbon atoms. The process is conducted at temperatures of at most about 50° C. but generally above about —20° C., and in the pressure range of atmospheric up to about 30 atmospheres.

---

The invention relates to a process for preparing alkenyl norbornenes.

It is known (for instance from the U.S. patent specification 3,183,249) that alkenyl norbornenes can be prepared by reaction between certain cyclopentadiene derivatives and certain butadiene derivatives. This known process has, however, the disadvantage that large quantities of starting material are converted to undesirable byproducts, so that the production yield of alkenyl norbornenes is low and problems of separation occur.

It is also known that a dimerization or oligomerization of open-carbon-chain alkenes can be achieved under the influence of a catalyst system comprising a coordination compound of an element of the VIIIth group of the Periodic System of Elements (notably iron, cobalt, or nickel), or comprising the complex obtained (under conditions appropriate thereto) by combination of an alkyl metal compound and a salt of an element of Group VIII. For instance, the codimerization of ethylene with propylene to a mixture of hydrocarbons with four to six carbon atoms is well known (see, for instance, Angew. Chem. 78 (1966), 157).

Further, it is known (Chem. Ber. 95 (1962), 2764) that with the aid of such a catalyst system an oligomerization of norbornadiene-2,5 can also be achieved. However, this process calls for high reaction temperature and long reaction times, probably as a result of the low reaction kinetics of the bicyclic hydrocarbon as compared with acyclic hydrocarbons in this type of reaction.

It is also known (J. Org. Chem. 35 (1970), 272) that in the reaction of butadiene-1,3 and norbornadiene-2,5, about 40% of norbornadiene dimers and about 60% of tri- and tetracyclic by-products develop under the influence of the catalyst system iron (III) acetylacetonate/diethylaluminumchloride/bis-(diphenylphosphino)ethane.

Nothing has yet been published about endeavors to prepare alkenyl norbornenes by reaction of norbornadiene-2,5, or a derivative thereof, with an alkene with an open carbon chain with such a catalyst system.

Experiments have now shown that it is possible to successfully carry out such a reaction.

A process has now been found, according to this invention, for preparing alkenyl norbornenes in which, under the influence of a catalyst system having as components an alkyl metal compound and a salt of an element of the VIIIth group of the Periodic System, norbornadiene-2,5, or a derivative thereof, is made to react with an alkene having an open carbon chain.

Useful products are obtained using an alkene with 2–10 carbon atoms and a terminal double bond. The most useful products are obtained with an alkene with 2–4 carbon atoms. Alkenes with more than 10 carbon atoms may be used, but this offers no advantages.

The norbornadiene-2,5 compound may be the unsubstituted norbornadiene-2,5, or an alkyl substituted norbornadiene-2,5 such as 2-methyl norbornadiene-2,5, 7-methyl norbornadiene-2,5 and 7,7-dimethyl norbornadiene-2,5. Preferably, the carbon atoms of at least one of the two double bonds of the norbornadiene-2,5 structure bear no substituents.

Good results can be obtained if cobalt is used as element of the VIIIth group; in that case, both a high conversion and a high alkenyl-norbornene conversion efficiency can be achieved.

Very good results can also be obtained, however, if nickel is used as element of the VIIIth group.

The nature of the acid residue in the salt of the element of the VIIIth group is not essential. A halide may be used for instance. The chloride is especially attractive because of its relatively low price. Further, use can be made of, for instance, an acetylacetonate or another chelate, which, though more expensive than the chloride, has the advantage of being soluble in the hydrocarbon mixture to a certain degree. Salts of other inorganic and organic acids may be used, if desired, e.g. bromides, sulfates, phosphates, carboxylates and phenolates. The metal carbonyls can also be used.

For the alkyl metal compound use can be made of, for instance, alkyl compounds of the metals of the Groups I, II and III of the periodic system, in which, besides alkyl groups, acid residue groups, such as chloride, may also be bound to the metal atom. The alkyl group may contain from 1 to 10 carbon atoms or more. In practice metal compounds wherein the alkyl groups have 1–4 carbon atoms are most easily prepared and are thus preferred. The carbon chain may be straight or branched. As the metal in the alkyl metal compound, aluminum or magnesium are most suitable. Other suitable metals are lithium, zinc and gallium. Examples of suitable alkyl metal compounds are butyllithium, triethylaluminum, triisobutylaluminum, diethylaluminumchloride and dibutylmagnesium.

The best results can be achieved when the alkyl metal compound employed is one in which at most half of the bonds of the metal atoms are bonds to alkyl groups.

An example of such a compound is ethylaluminumdichloride. Optimum, notably in conversion rate, is sesquiethylaluminumchloride of the composition $$(C_2H_5)_3Al_2Cl_3$$

An explanation of the dependence, notably of the conversion rate, on the nature of the alkyl metal compound might be the fact that the alkyl metal compound has to carry out two functions which make conflicting demands on the composition. On the one hand, the alkyl metal compound may have to act as a Lewis acid, which behaviour would be adversely influenced by the presence of alkyl groups on the metal atom, and on the other it may have to act as a reducing agent, which activity would call for as many as possible alkyl groups to be present on the metal atom. Apparently, the compromise lies approximately midway, but more to the side of a lower alkylation of the metal atom than to the side of a higher alkylation.

As is the case with the dimerization of alkenes with an open carbon chain, it is of advantage here that a phosphine is also used as a component of the catalyst system. On the contrary, however, it has been found that, as contrasted with these known dimerization processes, no excess phosphine, based on the amount of the salt of the element of the VIIIth group, should be applied.

According to the invention a mixing ratio is applied such that for every atom of the element of the VIIIth group at most 1 atom of phosphorus in the form of a phosphine is present. In this way there is achieved a suppression of the strong, mutual oligomerization of molecules of the alkene with open carbon chain comonomers which reaction is at the expense of the so-called cross-reaction between such an alkene molecule and a molecule of the norbornadiene-2,5 or a derivative thereof.

If too small a quantity of a phosphine is used, both the degree of conversion and the alkenyl-norbornene efficiency on the basis of converted norbornadiene or its derivative will decrease again. The optimum value lies between 0.5 and 1 atom of P in the form of phosphine per atom of the element of the VIIIth group.

As the phosphine, use can be made of, for instance, trimethylphosphine, triethylphosphine, triphenylphosphine, tributylphosphine or 1,2-bis(diphenylphosphino) ethane. However, it has been found that the alkenyl-norbornene efficiency can be increased further by using a phosphine in which strongly electron-donating groups are bound to the phosphorus atom, such as triisopropylphosphine. The use of a compound in which strongly electron-withdrawing groups, such as chlorine atoms, are bound to the phosphorus atom is to be advised against.

An appreciable improvement in the alkenyl-norbornene efficiency is further to be achieved if the catalyst system contains as components an alkyl metal compound in which the central atom is not fully alkylated in combination with a second alkyl metal compound in which the metal is fully alkylated. Suitable such second alkyl metal components include dibutyl magnesium and particularly triethylaluminum. A suitable working method in the preparation of the catalyst system consists in mixing the alkyl metal compound, in which the metal is fully alkylated, with a mixture of the salt of the element of the VIIIth group and, possibly, the phosphine, prior to adding the other alkyl metal compound, notably the one in which the metal is not fully alkylated.

The mutual coupling reaction of molecules of the alkene with an open carbon chain compound can further be suppressed to a considerable degree, in favor of the cross-reaction, by simultaneously adding the norbornadiene or its derivative and the alkyl metal compound in which the metal is not fully alkylated to the reaction mixture, which mixture contains the alkene and the salt of the element of the VIIIth group of the Periodic System of Elements by the side, if present, of the phosphine and the alkyl metal compound in which the metal is fully alkylated. In that case, a higher alkenylnorbornenes efficiency, calculated on the basis of converted alkene with an open hydrocarbon chain, can be reached.

It has also been found that the higher the reaction temperature is, the more norbornadiene or its derivative is converted to its oligomers and polymers and, hence the alkenylnorbornenes conversion efficiency, referred to converted norbornadiene or its derivative, decreases. In applying the process according to the invention a reaction temperature of less than about 50° C. will suffice. At a temperature of less than about −20° C. the reaction proceeds so slowly that reaction times in the order of several hours are necessary. A good compromise between the efficiency and the reaction time is a reaction temperature of between −10 and 0° C.

The process according to the invention is particularly suitable for the preparation of 5-vinylnorbornene-2 from norbornadiene-2,5 and ethylene. A large conversion rate can then be achieved by working with ethylene under pressure, for instance, at 10–20 ats. g.

The 5-vinylnorbornene-2 can, in a known way, be processed to 5-ethylidenenorbornene-2, which, as is known, finds application as a feedstock in the preparation of certain types of synthetic rubber.

Several other alkenyl-norbornenes which can be prepared according to the process of the invention have been reported to be fit for use, as such or after further conversion, as a feedstock for certain types of synthetic rubber.

EXAMPLE I

An autoclave was successively supplied with 500 ml. of dry benzene, 6 mmol of nickelacetylacetonate and 2 mmol of 1,2-bis(diphenylphosphino)ethane, whereupon the autoclave was closed and brought under a pressure of 16 ats. g. by introduction of ethylene. With the aid of a cooling coil the temperature was brought to −8° C. Now, 32 mmol of sesquiethylaluminumchloride and 0.5 mol of norbornadiene-2,5 were added simultaneously at such rate that the tempearture remained below −5° C. During the addition, the original green color changed, through red, into red-brown. The dosing vessels were flushed with benzene, whereupon the reaction was continued for 1 hour. After the pressure had been released and the reaction mixture drained, the catalyst was destroyed using 20 cc. of methanol. The volatile components were distilled off, whilst the residue was distilled in vacuo.

The yield amounted to 13.7 g. of 5-vinylnorbornene-2 (23.7%), and the efficiency to 41.3% on the basis of converted norbornadiene-2,5.

EXAMPLE II

The autoclave (see Example I) was supplied with 500 ml. of benzene, 3 mmol of nickelacetylacetonate and 2 mmol of 1,2-bis(diphenylphosphino)ethane. After the autoclave had been closed, the pressure was brought at 16 ats. g. and the temperature at 0° C. In the same way as described in Example I, 5.4 g. (9.4%) of 5-vinylnorbornene-2 were then obtained and the efficiency amounted to 20.5%.

EXAMPLE III

The autoclave (see Example I) was supplied with 350 ml. of benzene, 3 mmol of nickelacetylacetonate, 1 mmol of 1,2-bis(diphenylphosphino)ethane and 6 mmol of triethylaluminum. The experiment was further conducted in the same way as described in Example II. The yield amounted to 8.2 g. (14%) of 5-vinylnorbornene-2 and the efficiency to 67%.

EXAMPLE IV

The apparatus described in Example I was supplied with 350 ml. of benzene, 3 mmol of nickelacetylacetonate and 2 mmol of triisopropylphosphine. By introduction of ethylene the pressure was brought to 16 ats. g. and the temperature was brought to −15° C., whereupon 16 mmol of sesquiethylaluminumchloride and 0.5 mol of norbornadiene were added. The reaction was discontinued after 1 hour and the reaction mixture processed as described in Example I. The yield amounted to 4.5 g. (7.8%) of 5-vinylnorbornene-2 and the efficiency to 44.1%.

EXAMPLE V

The autoclave (see Example I) was supplied with 350 ml. of benzene, 3 mmol of nickelacetylacetonate and 1 mmol of 1,2-bis(diphenylphosphino)ethane. The experiment was conducted in the same way as described in Example I, but the temperature was kept between 35 and 40° C. After the reaction, the reaction mixture was added in drops to a mixture of 200 ml. of acetone and 200 ml. of methanol. The resulting precipitate was filtered off. The precipitate consisted of a polymer product containing vinyl -and norbornene groups according to the infra-red spectrum. Subsequently, the reaction mixture was washed with 4 N hydrochloric acid. The organic layer was washed until neutral and then dried on $MgSO_4$. Following distillation, 3.05 g. (10.5%) of 5-vinyl norbornene-2 were obtained, the efficiency amounting to 12%.

EXAMPLE VI

According to the method described in Example I, an experiment was conducted in which 3 mmol of cobalt (III) acetylacetonate, 1 mmol of 1,2-bis(diphenylphosphino)ethane and 16 mmol of sesquiethylaluminumchloride were used as catalyst. After a reaction time of 1 hour and after the reaction mixture had been processed, 2.8 g. of 5-vinylnorbornene-2 (efficiency 29%) were obtained.

EXAMPLE VII

When the process of Example I was carried out with diethylaluminumchloride instead of with sesquiethylaluminumchloride, the desired product was obtained with an efficiency of 5%.

EXAMPLE VIII

The process of Example I was carried out with only nickel acetylacetonate and sesquiethylaluminumchloride as catalyst components, no phosphine being present.

The product was obtained with an efficiency of 2%.

It will then be seen from the foregoing examples and discussion that alkenyl norbornenes can be prepared according to this invention by reaction of a norbornadiene-2,5 with open chain alkene having from 2 to 10 carbon atoms, and a terminal double bond the process being carried out with a catalyst system essentially comprising:

(1) an alkyl compound of a metal of one of the Groups I, II and III of the Periodic Table, preferably aluminum or magnesium, and wherein the alkyl groups have from 1 to 10 carbon atoms, preferably 1 to 4 carbon atoms; and (2) the inorganic or organic acid salt of a metal of Group VIII of the Periodic Table, the chloride or acetylacetonate salt being preferred, but the nature of the acid salt residue not being critical; as well as, optionally, (3) an aliphatically-saturated phosphine, carrying either alkyl or aryl substituents of up to 10 carbon atoms each; and, (4) a second, fully alkylated, compound of a metal of one the Groups I, II and III of the Periodic Table, preferably magnesium or aluminum, the alkyl groups of which compound can have up to about 10 carbon atoms.

This process is conducted at temperatures of at most about 50° C. but generally above about −20° C., and in the pressure range of atmospheric up to about 30 atmospheres. With the aforesaid catalyst system and under the indicated conditions, contrary to what would be expected from the prior art described at the beginning of this specification, the desired reaction to form alkenyl norbornenes proceeds and alkenyl norbornenes can be obtained. The strong reaction tendency to form dimers or oligopolymers of the alkene and norbornadiene-2,5 starting materials can be suppressed by means indicated in the foregoing.

While the foregoing examples have illustrated the practice of the invention using ethylene and norbornadiene-2,5 is the starting materials, the same procedure may be used with other starting materials as contemplated by this invention. That is, the procedure of the foregoing may be followed in which, in place of ethylene there may be used any other open-carbon-chain alkene, having up to about 10 carbon atoms, preferably with a terminal double bond; and, in the place of the norbornadiene-2,5-there may be used a norbornadiene-2,5 derivative carrying one or more aliphatically-saturated hydrocarbon substituents, of up to 10 carbon atoms, said substituents being attached in such a way that the carbon atoms of at least one of the two double bonds of the norbornadiene-2,5 structure are free from substituents. When such different starting materials are employed, similar results to the foregoing examples are observed, the product of the reaction being the corresponding 5-alkenyl (aliphatically-saturated hydrocarbon-substituted) norbornene-2.

It will accordingly be appreciated that the practice of this invention is not limited to the specific embodiments described in the foregoing working examples, which serve only to illustrate presently preferred ways of carrying out the invention.

What is claimed is:

1. A process for the preparation of 5-alkenyl norbornene-2 compounds which essentially comprises reacting an open-carbon-chain alkene.

having from two to about 10 carbon atoms and a terminal double bond, with a norbornadiene-2,5 compound which is at most substituted by one or more alkyl substituents in such a way that the carbon atoms of at least one of the two double bonds of the norbornadiene structure bear no substituents, at a temperature between −20° C. and 50° C. and a pressure between atmospheric and up to about 30 atmospheres, and in the presence of a catalyst system essentially comprising, (1) an alkyl metal compound of a metal of one of the Groups I, II and III of the Periodic Table, and wherein the alkyl groups have from 1 to 10 carbon atoms; and (2) the inorganic or organic acid salt of a metal of Group VIII of the Periodic Table, and wherein the acid residue is the residue of a strong mineral acid or of an aliphatically-saturated carboxylic acid, chelate or a phenol.

2. The process of claim 1 wherein said Group VIII metal is nickel.

3. The process of claim 1 wherein said Group VIII metal is cobalt.

4. The process of claim 1 wherein said acid salt residue is chloride.

5. The process of claim 1 wherein said acid salt residue is acetylacetonate.

6. The process of claim 1 wherein said alkyl compound is a compound of aluminum or magnesium.

7. The process of claim 1 wherein at most half of the metal valences of said alkyl metal compound are satisfied by bonds to alkyl groups.

8. The process of claim 1 wherein said catalyst further comprises a component compound of (3) an aliphatically-saturated phosphine compound carrying alkyl or aryl substituents having up to 10 carbon atoms each.

9. The process of claim 8 wherein said phosphine is triisopropyl phosphine.

10. The process of claim 8 wherein said phosphine is 1,2-bis(diphenylphosphino)ethane.

11. The process of claim 1 wherein said catalyst system further comprises a component composed of (3) an aliphatically-saturated phosphine, carrying either alkyl or aryl substituents of up to 10 carbon atoms each; and a second, fully alkylated, metal compound wherein the metal is magnesium or aluminum, the alkyl groups of which can have up to about 10 carbon atoms.

12. The process of claim 1 wherein said catalyst system further comprises a component (4) composed of a second fully alkylated metal compound wherein the metal is magnesium or aluminum, the alkyl groups of which can have up to about 10 carbon atoms.

13. The process of claim 15 wherein said norbornadiene-2,5 and said catalyst component (1) are added simultaneously to a reaction mixture of said alkene and said catalyst components (3) and (4).

14. The process according to claim 1 wherein 5-vinyl-norbornene-2 is prepared from norbornadiene-2.5 and ethylene.

15. The process of claim 11 wherein said catalyst system further comprises a component (4) composed of a second fully alkylated metal compound wherein the metal is magnesium or aluminum, the alkyl groups of which can have up to about 10 carbon atoms.

References Cited
UNITED STATES PATENTS 3,472,824   10/1969   Nakaguchi et al. ___ 260—666 Py DELBERT E. GANTZ, Primary Examiner V. O'KEEFE, Assistant Examiner